United States Patent

[11] 3,599,486

[72] Inventors Franz Pernau
Vienna;
Karl Klerr, Mollersdorf, both of, Austria
[21] Appl. No. 854,945
[22] Filed Sept. 3, 1969
[45] Patented Aug. 17, 1971
[73] Assignee Semperit Osterreichisk-Amerikanische Gummiwerke Aktiengesellschaft

[54] TIRE SHOULDER TESTING MACHINE
6 Claims, 4 Drawing Figs.

[52] U.S. Cl. .................................................... 73/146
[51] Int. Cl. ................................................G01m 17/02

[50] Field of Search............................................ 73/146

[56] References Cited
UNITED STATES PATENTS

| | | | |
|---|---|---|---|
| 3,130,957 | 4/1964 | Branick ........................ | 73/146 X |
| 3,316,758 | 5/1967 | Wild............................. | 73/146 |

*Primary Examiner*—Donald O. Woodiel
*Attorney*—Ernest F. Marmorek

ABSTRACT: A machine for testing the shoulder tensile strength of a pneumatic tire has a revolving drum on which the tire rolls, and an obstacle that is mounted on the drum and projects into the region of the tire shoulder to simulate the mounting of the tire on a curbstone.

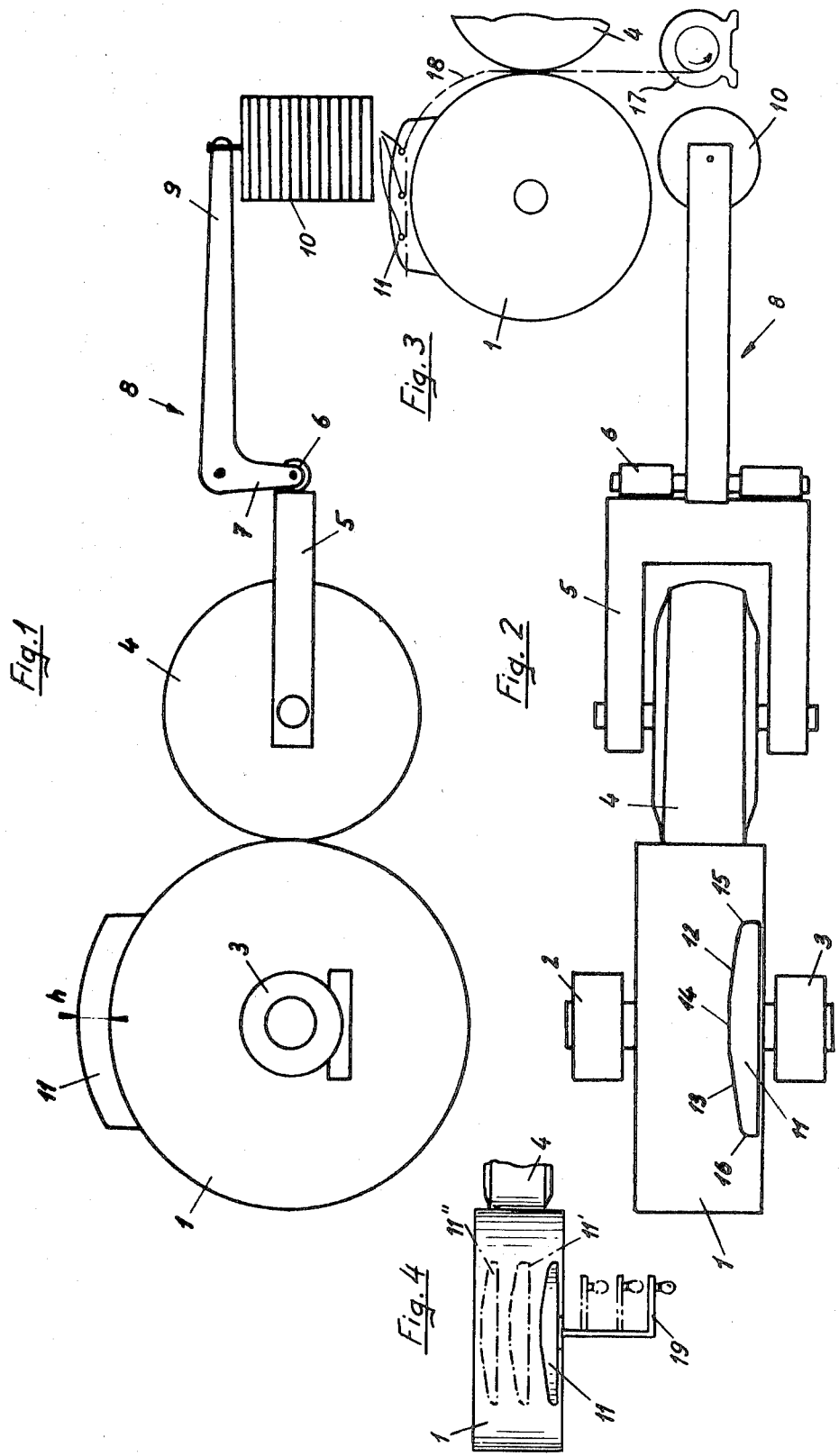

TIRE SHOULDER TESTING MACHINE

BACKGROUND OF THE INVENTION

The invention relates to pneumatic tires, and relates more particularly to machinery for testing the shoulder tensile strength of such a tire against the external encircling surface of a revolving drum, on which the tire rolls.

When an automotive vehicle mounts a curbstone at an acute angle, there will occur in the shoulder zone of the mounting tire very large stresses, that often cause external and internal injury to the tire. The worst damage usually occurs on such occasion in double tires of trucks, as in such a case the shoulder of one tire must absorb double the usual load.

Tires with an encircling band or rib pattern are particularly endangered when mounting a curbstone at an acute angle, as during such mounting on the curbstone the marginal rib is tilted away and torn. Tires with a crossband or rib pattern, on the other hand, are somewhat less endangered, as the sudden tilting away of the marginal rib is prevented by the crosswise reinforcement. Investigations and tests involving automotive vehicles, however, are difficult to carry out, and in many geographical areas are often restricted to a certain season. In view of these difficulties, the industry often has turned to tests in the laboratory, rather than on the road.

SUMMARY OF THE INVENTION

It is accordingly among the principal objects of the invention to provide a tire testing machine which is capable of testing the tire construction during the aforesaid type of stress.

It is another object of the invention to provide such a testing machine that may be used also for other test series.

Further objects and advantages of the invention will be set forth in part in the following specification and in part will be obvious therefrom without being specifically referred to, the same being realized and attained as pointed out in the claims hereof.

With the above and other objects of the invention in view, the invention consists in the novel construction, arrangement and combination of various devices, elements and parts, as set forth in the claims hereof, one embodiment of the same being illustrated in the accompanying drawings and described in the specification.

Generally speaking, the instant invention provides a machine for testing the shoulder tensile strength of a pneumatic tire, that has a revolving drum with a circumferential external surface, and the tire rolls on that external surface; and in the region of the tire shoulder, there is mounted on the external surface of the revolving drum an obstacle that will thus test the shoulder of the tire.

In accordance with a preferred embodiment, the obstacle is movable parallel to the axis of rotation on the drum, so that the obstacle can thus be positioned with precision in accordance with the particular shape of the tire tested; and the tire may be tested along various shoulder zones.

To simulate closely the mounting of the tire of an automotive vehicle on a curbstone, the obstacle preferably should have the height of a normal curbstone.

BRIEF DESCRIPTION OF THE VIEWS

For a fuller understanding of the nature and objects of the invention, reference should be had to the following detailed description, taken in connection with the accompanying drawings, in which:

FIG. 1 is a side elevational view of a testing machine in accordance with the invention;

FIG. 2 is a plan view thereof;

FIG. 3 is a fragmentary side elevational view similar to Fig. 1; and

FIG. 4 is a plan view similar to FIG. 2 but showing various positions of the obstacle.

DESCRIPTION OF THE PREFERRED EMBODIMENT.

In carrying the invention into effect in one of the embodiments which has been selected for illustration in the accompanying drawings and for description in this specification, there is provided a revolving drum 1 that is journaled in two bearings 2 and 3. Driving means 17 are provided for rotating the revolving drum 1.

A tire 4 is pressed against the circumferential external surface of the revolving drum 1, and is journaled in a fork 5. Means are provided for pressing the tire 4 against the revolving drum 1, that comprise a two-armed lever 8 that has a short arm 7 which mounts rolls 6 which press against the end surface of the fork 5; near the end of the other arm 9 of the lever 8, there is mounted a load 10. Due to this arrangement, the rolls 6 will press the fork 5 in a direction (to the left in the drawing) to increase the pressure between the tire 4 and the drum 1. The pressure may be adjusted by changing the weight of the load 10.

On the aforesaid circumferential external surface of the revolving drum 1 there is mounted an arcuate (see Fig. 1) obstacle 11, the height $h$ of which corresponds to the height of a normal, average curbstone. As best shown in Fig. 2, the obstacle 11 has a side surface 14 that moves during the rotation of the drum 1 and tire 4 in the direction of that rotation. A leading oblique surface 12 and a trailing oblique surface 13 are inclined, at an angle, to said direction. The angle of inclination of said surfaces 12 and 13 is between 5° and 15°, preferably 10°. It has been found that a tire will be stressed to the maximum if it mounts a curb at that angle. The obstacle 11 may be adjusted relative to the drum 1, parallel of the axis thereof by conventional means, such as a crank 19 (Fig. 4).

If that angle is chosen larger than indicated herein, then a tire will mount the obstacle too fast. If, on the other hand, that angle is chosen smaller, then normally the tire will slide off that obstacle laterally.

In order to prevent unnecessary damage to the tire prior to the commencement of the test, the edges 15 and 16 of the obstacle 11 have been rounded.

It has been found that the usual driving means for normal tire test machines of the revolving drum type is insufficient to pass the obstacle 11 past the tire 4. Therefore, in accordance with a preferred embodiment, a separate driving mechanism should be provided for forcing the obstacle 11 past the tire 4. It was found to be sufficient, on the other hand, to accomplish this pulling through at relatively low speed. For this purpose, there may, for instance, be provided a pulling chain 18 about the aforesaid external circumferential surface of the drum 1, which chain may be connected to the obstacle 11, and which is driven by a separate driving means 17, such as a transmission engine (FIG. 3).

The obstacle may, of course, also have a different shape. For example, these shapes may simulate all curbstone formations that are found in practice on the various roads.

Experience has shown that the tire should run on the testing machine for a period sufficient to heat the tire to a normal operating temperature, before the instant shoulder tensile strength test is applied with the aid of the obstacle 11. This may be accomplished by first removing the obstacle 11 off the revolving drum 1, and then letting the tire run on the testing machine until it has picked up the normal operating temperature, and then only to mount the obstacle 11 on the revolving drum 1 for the shoulder tensile strength test.

We wish it to be understood that we do not desire to be limited to the exact details of construction shown and described, for obvious modifications will occur to persons skilled in the art.

Having thus described the invention, what we claim as new and desire to be secured by Letters Patent, is as follows:

1. A machine for testing the shoulder tensile strength of a pneumatic tire, comprising in combination, a revolving drum having an axis of rotation and a circumferential external surface, said surface being operable to receive said tire, said tire being adapted to roll on said external surface of said drum, an obstacle mounted at said external surface on said drum and so positioned that said obstacle during its course will project into the region of the shoulder of said tire, said drum revolving about an axis of rotation, and means for adjusting said obstacle on said drum parallel of said axis thereof.

2. A machine for testing the shoulder tensile strength of a pneumatic tire, comprising in combination, a revolving drum having an axis of rotation and a circumferential external surface, said surface being operable to receive said tire, said tire being adapted to roll on said external surface of said drum, an obstacle mounted at said external surface on said drum and so positioned that said obstacle during its course will project into the region of the shoulder of said tire, said obstacle having a radial height that corresponds to the normal height of a curbstone.

3. A machine for testing the shoulder tensile strength of a pneumatic tire, comprising in combination, a revolving drum having an axis of rotation and a circumferential external surface, said surface being operable to receive said tire, said tire being adapted to roll on said external surface of said drum, an obstacle mounted at said external surface on said drum and so positioned that said obstacle during its course will project into the region of the shoulder of said tire, said drum revolving about an axis of rotation, said obstacle having a side surface disposed in a plane intersecting at right angles said axis, and leading and trailing oblique surfaces intersecting said side surface at an angle of inclination.

4. A machine, as claimed in claim 3, said angle having a range of from about 5° to about 15°.

5. A machine, as claimed in claim 3, said angle being 10°.

6. A machine for testing the shoulder tensile strength of a pneumatic tire, comprising in combination, a revolving drum having an axis of rotation and a circumferential external surface, said surface being operable to receive said tire, said tire being adapted to roll on said external surface of said drum, an obstacle mounted at said external surface on said drum and so positioned that said obstacle during its course will project into the region of the shoulder of said tire, and separate driving means for passing said obstacle between the interengaging rolling surfaces of said revolving drum and of said tire.